United States Patent Office 3,289,098
Patented Nov. 29, 1966

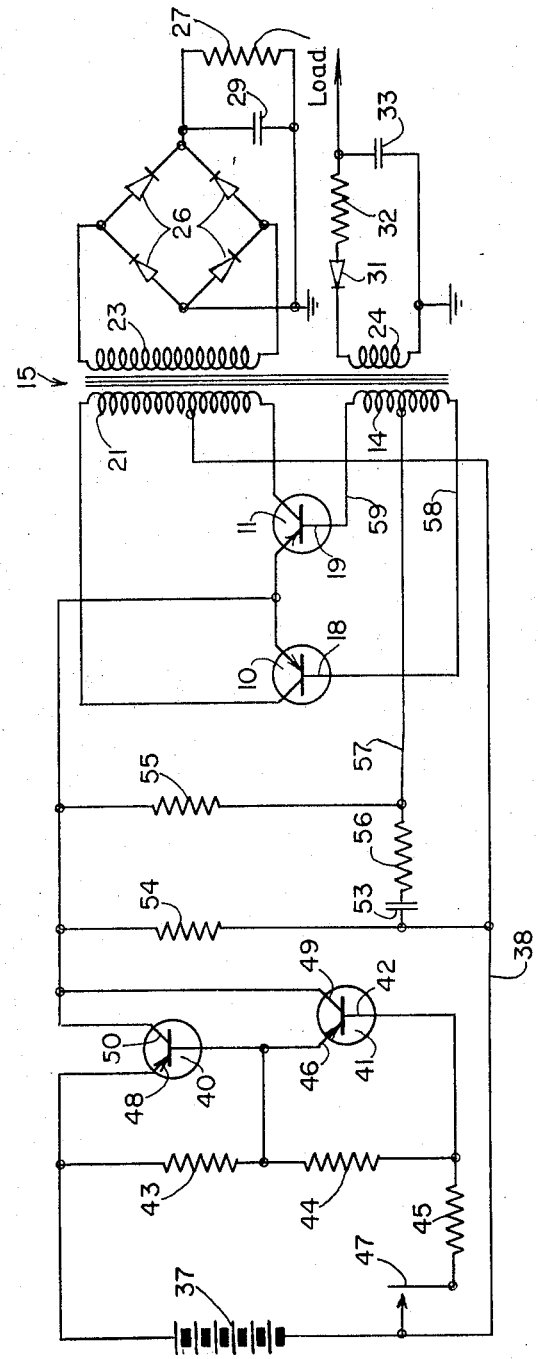

3,289,098
STARTING CIRCUIT FOR SEMICONDUCTOR
OSCILLATOR
Gary A. Cannalte, Hoffman Estates, Ill., assignor to
Motorola, Inc., Franklin Park, Ill., a corporation of
Illinois
Filed June 15, 1964, Ser. No. 375,143
6 Claims. (Cl. 331—62)

This invention relates to starting circuits for direct current to direct current converters and in particular to a starting circuit which is operative only upon the initial energization of the converter.

In direct current to direct current converters, a direct current bias voltage is applied to the switching transistors to insure the start of oscillation. After starting, oscillation is maintained by bias voltages for the switching transistors, which are derived from a feedback winding on the transformer of the converter. If a short circuit or heavy load develops across the secondary windings of the transformer, the bias voltage from the feedback winding ceases due to transformer overload. However, if the direct current starting bias voltage remains, both of the switching transistors tend to conduct and thermal runaway may take place.

Where the direct current to direct current converter is started by a switch operated at a location remote from the converter, as in mobile radio equipment, it is desirable to energize the converter with a minimum transfer of power from the remote location. Semiconductor switches, such as transistors, can be used to couple the converter to its power supply. While the transistor switch requires only a small amount of power from the remote location to turn on the converter, the transistor switch itself may consume a relatively large amount of power in its operation and place an undesirable load upon battery operated mobile equipment.

It is therefore an object of this invention to provide a direct current to direct current converted in which the switching transistors are protected against damage from excessive load currents.

Another object of this invention is to provide a direct current to direct current converter with a circuit operative to develop a bias current only upon initial energization of the converter.

Another object of this invention is to provide a direct current to direct current converter energizable through an on-off switch operable from a remote location and requiring a minimum amount of power for its operation.

A feature of this invention is the provision of a direct current to direct current converter with a starting bias circuit including a capacitor and a resistor, and in which the capacitor charging current flows through the resistor to develop a starting bias voltage across the resistor for the switching transistors. As the capacitor remains charged during operation, the starting bias is removed, and if the switching bias is not present, as during overload, the converter stops.

Another feature of this invention is the provision of a direct current to direct current converter with a compound connected transistor switch coupling the converter to its power supply for starting the same, and adopted for operation from a remote location.

The invention is illustrated in the drawing which is a schematic diagram of a direct current to direct current converter including a circuit for generating a starting bias voltage.

In practicing this invention a direct current to direct current converter is provided with a transistor starting switch coupling the converter to one terminal of its power supply. A capacitor and resistor are series connected from the other terminal of the supply to the starting switch. Closing the switch causes a charging current to flow through the resistor to the capacitor. The charging current through the resistor develops a bias voltage which is coupled to the switching transistors of the converter to insure the start of oscillation. When the capacitor is fully charged no bias voltage is developed across the resistor. The bias voltage required to maintain oscillation of the switching transistors is provided from a feedback winding on the transformer of the converter. If the feedback bias voltage ceases due to a transformer overload, no bias voltage will be provided to the switching transistors and they will become non-conductive. Since the capacitor is fully charged, no starting bias voltage will be developed and thermal runaway and damage to the switching transistors is prevented.

In order to start oscillation, after it has ceased for any reason, the converter is turned off for a period of time. This allows the starting capacitor to discharge and the voltage across the capacitor is reduced to zero. If the converter is now turned on, a starting bias voltage will be developed by charging current to the capacitor. The on-off switch used in the converter is a compound-connected transistor pair which will couple the converter to its power supply with a minimum of energy dissipation in the switch.

Referring to the drawing, there is shown a converter circuit incorporating the features of this invention. Switching transistors 10 and 11 are coupled to opposite ends of feedback winding 14 of transformer 15. The voltage induced in feedback winding 14 alternately biases switching transistors 10 and 11 to a conductive state. Current flows through alternate portions of winding 21 of transformer 15 as transistors 10 and 11 become alternatively conductive and non-conductive. Changing the direction of current flow in winding 21 produces a changing magnetic flux in transformer 15 causing alternating current voltages to be induced in windings 14, 23 and 24. Winding 23 is coupled to diodes 26 which rectify the alternating current output. The resulting direct current is coupled to load 27 and filter capacitor 29. The output of secondary winding 24 is rectified by rectifier 31 and filtered by resistor 32 and capacitor 33 to provide a direct current voltage of a different magnitude than that supplied by diodes 26.

For supplying low voltage direct current to the converter, conductor 38 makes a connection to one terminal of battery 37. The other terminal of battery 37 is connected to the converter through compound-connected transistors 40 and 41 which form a transistor switch. Compound-connected transistors are an arrangement of two transistors in which the base of one is connected to the emitter of the other and the two collectors are connected together. The combination may be considered as a single transistor having a high current amplification factor. By using compound-connected transistors a small bias current, controlled by switch 47, can control the operation of the converter. The power dissipated in the transistor switch is a minimum as the current flow from emitter to collector of transistor 41 is added to the current flow from emitter to collector of transistor 40 and is used by the converter. When switch 47 is closed, a bias voltage is supplied to base 42 of transistor 41 through resistors 43, 44 and 45. Switch 47 is required to control only a small amount of power and thus can easily be operated at a location remote from the converter. The bias voltage on base 42 acts to turn on transistor 40, allowing current to flow from battery 37 through emitter 48 and collector 50 of transistor 40 and emitter 46 and collector 49 of transistor 41 to the converter.

In order to insure that switching transistors 10 and 11 will commence oscillation when switch 47 is closed, it is necessary to provide a bias voltage to bases 18 and 19 of transistors 10 and 11. This initial bias voltage is developed by capacitor 53 and resistors 55 and 56. Before the converter is turned on the voltage across capacitor 53 is zero. When switch 47 is closed, the flow of current through resistors 55 and 56 charges capacitor 53 and develops a bias voltage across resistor 55. This bias voltage is coupled to bases 18 and 19 of transistors 10 and 11 through conductor 57, secondary transformer winding 14 and conductors 58 and 59. This bias voltage biases both transistors 10 and 11 to conduction so that oscillation will start. When oscillation starts, the feedback voltages developed in transformer winding 14 override the direct current bias voltage developed across resistor 55 causing transistors 10 and 11 to become alternately conductive and non-conductive.

As capacitor 53 charges, the current through resistor 55 decreases and the direct current bias voltage developed across this resistor decreases. When capacitor 53 is fully charged, there is no longer a bias voltage developed across resistor 55. Thus, there will be no bias voltage applied to transistors 10 and 11 if the normal bias voltages from feedback winding 14 cease, and they will not conduct and thus be subject to thermal runaway and damage.

The rate at which capacitor 53 charges is determined by the time constant of capacitor 53 and resistors 55 and 56. When the voltage developed across resistor 55 causes one of the switching transistors 10 and 11 to conduct, a low impedance path through the conducting transistor is formed. This low impedance path bypasses resistor 55 and allows capacitor 53 to charge rapidly. In order to prolong the charging time of capacitor 53, and thus the time during which a bias voltage is developed, resistor 56 is connected in series with capacitor 53 in such a manner that it is not bypassed by a conductive switching transistor.

When switch 47 is opened, capacitor 53 will discharge through resistors 54, 55 and 56 to return to its uncharged condition. The discharge action develops a bias voltage which will bias off transistors 10 and 11. When capacitor 53 is discharged it is again in condition to supply a starting bias voltage to transistors 10 and 11 when switch 47 is again closed.

Thus a simple starting circuit for a direct current to direct current converter has been shown. The starting circuit provides a starting bias voltage to the converter switching transistors only upon initial energization of the converter and thus provides protection against thermal runaway if the normal converter bias voltages fail. In addition, a starting switch has been provided which can be remotely operated and which consumes a minimum amount of energy.

I claim:

1. A transistor oscillator starting circuit including in combination, first and second input terminals adapted to be coupled to direct current supply means, a plurality of switching transistors each having base and emitter electrodes, first circuit means coupled to said plurality of switching transistors forming therewith an oscillator circuit, second circuit means coupling said emitter electrodes of each of said plurality of switching transistors to said first input terminal, capacitor means coupled to said second terminal, first and second resistors series connected between said first input terminal and said capacitor means, and third circuit means coupling the common junction point of said first and second resistors to said base electrodes of each of said plurality of switching transistors, said first and second resistors being responsive to the charging current of said capacitor means to generate a bias potential whereby said switching transistors are biased to conduction, with only said first and second resistors and said capacitor means acting to provide said bias potential for said oscillator circuit.

2. A transistor oscillator starting circuit including in combination, first and second input terminals adapted to be coupled to direct current supply means, compound-connected transistor means including a pair of input transistors and input circuit means, output circuit means and control circuit means interconnected with said pair of input transistors, said input circuit means of said compound-connected transistor means being coupled to said first input terminal, switch means coupling said control circuit means of said compound-connected transistor to said second input terminal first circuit means including only resistance and capacitance connected between said output circuit means of said compound-connected transistor means and said second input terminal, oscillator circuit means including switching transistor means and second circuit means coupling said switching transistor means to said output circuit means of said compound-connected transistor means and said second input terminal, third circuit means coupling said resistance to said switching transistor means, said resistance being responsive to the charging current of said capacitance to generate a bias potential thereacross whereby said switching transistor means is biased to conduction.

3. A transistor oscillator starting circuit including in combination, first and second input terminals adapted to be coupled to direct current supply means, a plurality of switching transistors coupled to said first input terminal, each of said plurality of switching transistors having a control electrode and an input electrode, a first circuit means coupled to said plurality of switching transistors forming therewith an oscillator circuit, a capacitor coupled to said second input terminal, first and second resistors series connected between said first input terminal and said capacitor, second circuit means coupling the junction of said first and second resistors to said control electrodes, and third circuit means coupling said input electrodes to said first input terminal, said resistors being responsive to the charging current of said capacitor to generate a bias potential whereby said switching transistors are biased to conduction, with only said series connected capacitor and said first and second resistors acting to provide said bias for said oscillator circuit.

4. A transistor oscillator starting circuit including in combination, first and second input terminals adapted to be coupled to direct current supply means, compound-connected transistor means including an input circuit, a control circuit and an output circuit, switch means coupling one of said first and second input terminals to said control circuit, first circuit means coupling said input circuit of said compound-connected transistor means to the other of said first and second input terminals, a plurality of switching transistors coupled to said output circuit of said compound-connected transistor means, each of said plurality of switching transistors having a control electrode and an input electrode, second circuit means coupled to said plurality of switching transistors forming therewith an oscillator circuit, a capacitor coupled to said one input terminal, first and second resistors series connected between said output circuit of said compound-connected transistor means and said capacitor, third circuit means coupling the common junction point of said first and second resistors to said control electrodes of said plurality of switching transistors, and fourth circuit means coupling said input electrodes of said plurality of switching transistors to said output circuit of said compound-connected transistor means, said compound-connected transistor means being operative to supply charging current through said resistors to said capacitor whereby a bias potential is developed across said resistors and applied to said switching transistors to bias the same to conduction with only said series connected capacitor and said first and second resistors acting to provide said bias potential for said oscillator circuit.

5. A transistor oscillator starting circuit including in combination, first and second input terminals adapted to be coupled to direct current supply means, a plurality of switching transistors coupled to said first input terminal, each of said plurality of switching transistors having a control electrode, first circuit means coupled to said plurality of switching transistors forming therewith an oscillator circuit, a capacitor coupled to said second input terminal, a first resistor connected to said first input terminal and a second resistor connected between said first resistor and said capacitor, second circuit means coupled between the junction of said first and second resistors and said control electrodes, said first resistor being responsive to the charging current of said capacitor to generate a bias potential whereby said switching transistors are biased to conduction, with only said series connected capacitor and said first and second resistors acting to provide said bias potential for said oscillator circuit, said second resistor acting to limit said charging current whereby the time period during which said bias potential is generated is increased.

6. A transistor oscillator starting circuit including in combination, first and second input terminals adapted to be coupled to direct current supply means, a plurality of switching transistors each having base and emitter electrodes, first circuit means coupled to said plurality of switching transistors forming therewith an oscillator circuit, first and second input transistors having collector electrodes connected together and base and emitter electrodes, first, second and third resistors connected in series with said first resistor being connected to said first input terminal, first circuit means connecting said emitter electrode of said first input transistor to said first input terminal, second circuit means connecting the junction of said first and second resistors to said base electrode of said first input transistor and said emitter electrode of said second input transistor, third circuit means connecting said base electrode of said second input transistor to the common junction point of said second and third resistors, switch means connecting said third resistor to said second terminal, fourth circuit means coupling said emitter electrodes of each of said plurality of switching transistors to said collector electrodes of said first and second input transistors, capacitor means coupled to said second terminal, fourth and fifth resistors series connected between said collector electrodes of said first and second input transistors and said capacitor means, fifth circuit means coupling the common junction point of said fourth and fifth resistors to said base electrodes of each of said plurality of switching transistors, said first and second resistors being responsive to the charging current of said capacitor means to generate a bias potential whereby said switching transistors are biased to conduction, with only said fourth and fifth resistors and said capacitor means acting to provide said bias potential for said oscillator circuit.

References Cited by the Examiner

UNITED STATES PATENTS

| | | | |
|---|---|---|---|
| 2,968,739 | 1/1961 | Mohler | 331—113 |
| 3,008,068 | 11/1961 | Wilting et al. | 331—113 |
| 3,172,060 | 3/1965 | Jensen | 331—113 |

FOREIGN PATENTS 1,247,381  10/1960  France.

ROY LAKE, *Primary Examiner.*

S. H. GRIMM, *Assistant Examiner.*